United States Patent
Suzuki

(10) Patent No.: US 7,553,052 B2
(45) Date of Patent: Jun. 30, 2009

(54) LIGHT SOURCE UNIT MOUNTING STRUCTURE

(75) Inventor: Masakazu Suzuki, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 287 days.

(21) Appl. No.: 11/729,891

(22) Filed: Mar. 29, 2007

(65) Prior Publication Data

US 2007/0230177 A1      Oct. 4, 2007

(30) Foreign Application Priority Data

Mar. 31, 2006   (JP) ................................ 2006-096843

(51) Int. Cl.
*F21V 17/06* (2006.01)

(52) U.S. Cl. ................... 362/374; 362/375; 362/310; 362/368; 362/433; 362/439

(58) Field of Classification Search ................. 362/368, 362/353, 549, 548, 519, 306, 307, 374, 375, 362/344, 433, 439, 440, 441, 455, 456; 313/113, 313/114
See application file for complete search history.

(56) References Cited

U.S. PATENT DOCUMENTS

| | | | | |
|---|---|---|---|---|
| 2,826,682 A | * | 3/1958 | Falge | 362/273 |
| 3,878,388 A | * | 4/1975 | Germany | 362/374 |
| 4,388,679 A | * | 6/1983 | Blaisdell et al. | 362/306 |
| 5,025,358 A | * | 6/1991 | Cannell | 362/267 |
| 5,176,441 A | * | 1/1993 | Horvath dr.nee Vegh et al. | 362/267 |
| 5,506,464 A | * | 4/1996 | Ooms | 313/113 |

(Continued)

FOREIGN PATENT DOCUMENTS

EP          1 635 563 A2      3/2006

(Continued)

OTHER PUBLICATIONS

Patent Abstracts of Japan for Japanese Publication No. 11-052489, Publication date Feb. 26, 1999 (2 pages).

(Continued)

*Primary Examiner*—Bao Q Truong
(74) *Attorney, Agent, or Firm*—Osha • Liang LLP

(57) ABSTRACT

A light source unit mounting structure includes a light source unit, including a reflector for reflecting light of a light source on a concave reflecting surface to give a directivity; and a lamp holder, on which the light source unit is mounted by securing an opening edge part of a light emission opening of the reflector to the lamp holder. An annular flange portion around the light emission opening of the reflector mounted on a bearing surface provided at the lamp holder is elastically pressed by two pressers fastened by screws to the lamp holder, so that the flange portion is elastically pressed and retained in a thickness direction between the pressers and the bearing surface. An outer circumferential end face of the flange portion is pressed against a receiving face having a step shape provided outside of the bearing surface of the lamp holder with an outside surface of the reflector elastically pressed radially by a lateral pressure applying member fastened by a screw to the lamp holder, so that the opening edge part of the light emission opening of the reflector is elastically pressed and retained radially between the lateral pressure applying member and the receiving face.

8 Claims, 8 Drawing Sheets

U.S. PATENT DOCUMENTS

| | | | | |
|---|---|---|---|---|
| 5,560,706 | A * | 10/1996 | Yamazaki et al. | 362/549 |
| 6,086,224 | A * | 7/2000 | Sugimoto | 362/267 |
| 6,089,730 | A | 7/2000 | Machii | |
| 6,351,058 | B1 * | 2/2002 | Roberts | 313/113 |
| 6,830,362 | B2 * | 12/2004 | Mullen | 362/455 |
| 2001/0014021 | A1 * | 8/2001 | Duff et al. | 362/268 |
| 2003/0193811 | A1 * | 10/2003 | Mullen | 362/455 |
| 2004/0223125 | A1 | 11/2004 | Tamaru et al. | |

FOREIGN PATENT DOCUMENTS

| | | |
|---|---|---|
| JP | 11-52489 | 2/1999 |
| JP | 11-133507 | 5/1999 |
| JP | 11-258694 | 9/1999 |
| JP | 2002-341441 | 11/2002 |
| JP | 2004-362971 | 12/2004 |

OTHER PUBLICATIONS

Patent Abstracts of Japan for Japanese Publication No. 11-258694, Publication date Sep. 24, 1999 (2 pages).

Patent Abstracts of Japan for Japanese Publication No. 2002-341441, Publication date Nov. 27, 2002 (2 pages).

Patent Abstracts of Japan for Japanese Publication No. 11-133507, Publication date May 21, 1999 (2 pages).

Extended European Search Report for European Application No. 07006424.1-2209, dated Aug. 27, 2007 (3 pages).

Patent Abstracts of Japan for Japanese Publication No. 2004362971, Publication date Dec. 24, 2004 (1 page).

* cited by examiner

LIGHT SOURCE UNIT MOUNTING STRUCTURE

CROSS-REFERENCE TO RELATED APPLICATIONS

This application is based upon and claims the benefit of priority from prior Japanese patent application No. 2006-096843, filed on Mar. 31, 2006, the entire contents of which are incorporated herein by reference.

BACKGROUND OF THE INVENTION

The present invention relates to a light source unit mounting structure, and more particularly to a structure for mounting a light source unit for use in an optical apparatus such as a projector to a lamp holder.

There are various proposals for means for mounting a light source unit for a projector on a lamp holder, in which a linear spring member attached to the lamp holder is stretched over the outside surface of a reflector for the light source unit to elastically press the reflector to the lamp holder (e.g., refer to JP-A-11-52489 and JP-A-11-258694). Also, there is a proposal in which the leaf springs attached on the lamp holder are elastically pressed to a plurality of locations around the reflector, and the reflector is elastically pressed and retained by the leaf springs and the lamp holder (e.g., refer to JP-A-11-133507). Further, a flange portion of the lamp unit is sandwiched between a base plate and a pressing plate, the pressing plate being held by screws, and elastically pressed by a spring (e.g., refer to JP-A-2002-341441).

However, in the above patent documents, means for attaching the reflector to the lamp holder by elastically pressing an opening edge part of a light emission opening of the reflector to the lamp holder was only described, but no measure for positioning the reflector radially was taught.

SUMMARY

It is therefore an object of the invention to enhance the optical performance of an optical apparatus such as a projector by providing means for attaching a reflector to a lamp holder in a simple operation by elastically pressing an opening edge part of the light emission opening of the reflector to the reflector in mounting the reflector on the lamp holder, and a measure for positioning the reflector to the lamp holder radially accurately and easily, and improve the mounting workability of the reflector on the lamp holder.

In order to achieve the object, according to the invention, there is provided a light source unit mounting structure comprising:

a light source unit, including a reflector for reflecting light of a light source on a concave reflecting surface to give a directivity; and a lamp holder, on which the light source unit is mounted by securing an opening edge part of a light emission opening of the reflector to the lamp holder, wherein an annular flange portion around the light emission opening of the reflector mounted on a bearing surface provided at the lamp holder is elastically pressed by two pressers fastened by screws to the lamp holder, so that the flange portion is elastically pressed and retained in a thickness direction between the pressers and the bearing surface, and an outer circumferential end face of the flange portion is pressed against a receiving face having a step shape provided outside of the bearing surface of the lamp holder with an outside surface of the reflector elastically pressed radially by a lateral pressure applying member fastened by a screw to the lamp holder, so that the opening edge part of the light emission opening of the reflector is elastically pressed and retained radially between the lateral pressure applying member and the receiving face, the flange portion is elastically pressed at two locations on opposite sides across a center of the flange portion by the two pressers, one elastically pressed location of the reflector by the lateral pressure applying member is defined at a mutually central position between two elastically pressed locations of the flange portion by the pressers, and an elastically pressing direction of the lateral pressure applying member on the outside surface of the reflector is orthogonal to an opposite direction of the two elastically pressed locations of the flange portion by the pressers;

the presser includes a first main piece part overlaid on a first mounting surface of the lamp holder, a first leg piece part bent from the first main piece part and inserted into a first recess portion opened on the first mounting surface of the lamp holder, a first mounting piece part fixed to the lamp holder by a first mounting screw screwed into a first tapped hole opened on the first mounting surface of the lamp holder, and a first pressure acting piece projecting on an opposite side of the first mounting piece part across the first leg piece part and pressing the flange portion against the bearing surface by elastically contacting with the flange portion;

the lateral pressure applying member includes a second main piece part overlaid on a second mounting surface of the lamp holder, a second leg piece part bent from the second main piece part and inserted into a second recess portion opened on the second mounting surface of the lamp holder, a second mounting piece part fixed to the lamp holder by a second mounting screw screwed into a second tapped hole opened on the second mounting surface of the lamp holder, and a second pressure acting piece projecting on an opposite side of the second mounting piece part across the second leg piece part and pressing the reflector radially by elastically contacting with the outside surface of the reflector; and an opening angle of the first leg piece part from the first main piece part is larger than the right angle, so that a root and a top end of the first leg piece part within the first recess portion on a side of the lamp holder into which the first leg piece part is inserted are elastically contacted with an inner wall face of the first recess portion, and an opening angle of the second leg piece part from the second main piece part is larger than the right angle, so that a root and a top end of the second leg piece part within the second recess portion on a side of the lamp holder into which the second leg piece part is inserted are elastically contacted with an inner wall face of the second recess portion.

In order to achieve the object, according to the invention, there is also provided a light source unit mounting structure comprising:

a reflector, adapted to reflect light of a light source to give a directivity and provided with a flange portion including a first surface and a second surface;

a lamp holder, including a third surface facing the first surface, a fourth surface facing the second surface, a fifth surface, and a sixth surface;

a first mounting structure, including a first pressing member fixed on the fifth surface and pressing the flange portion to the lamp holder in a first direction so that the first surface of the flange portion is held in contact with the third surface of the lamp holder; and a second mounting structure, including a second pressing member fixed on the sixth surface and pressing an outer surface of the reflector in a second direction perpendicular to the first direction so that the second surface of the flange portion is held in contact with the fourth surface of the lamp holder.

The light source unit mounting structure may further comprise: a third mounting structure, having a similar structure to the first mounting structure. The first and third mounting structures may be arranged at opposite sides of a center of the flange portion. The second mounting structure may be arranged between the first and third mounting structures.

The second direction may be orthogonal to an opposite direction of the first and third mounting structures.

The first pressing member may include a main piece mounted on the fifth surface of the lamp holder, a leg piece bent from the main piece and inserted into a recess portion formed on the fifth surface of the lamp holder, a mounting piece fixed to the lamp holder by a screw screwed into a tapped hole formed on the fifth surface of the lamp holder, and a pressure piece pressing the flange portion against the third surface of the lamp holder and projecting on an opposite side of the mounting piece across the leg piece.

An angle of the leg piece from the main piece may be larger than the right angle, so that a root and a top end of the leg piece within the recess portion are contacted with an inner wall face of the recess portion.

The second pressing member may include a main piece mounted on the sixth surface of the lamp holder, a leg piece bent from the main piece and inserted into a recess portion formed on the sixth surface of the lamp holder, a mounting piece fixed to the lamp holder by a screw screwed into a tapped hole formed on the sixth surface of the lamp holder, and a pressure piece pressing the outer surface of the reflector in the second direction and projecting on an opposite side of the mounting piece across the leg piece.

An angle of the leg piece from the main piece may be larger than the right angle, so that a root and a top end of the leg piece within the recess portion are contacted with an inner wall face of the recess portion.

DETAIL DESCRIPTION OF PREFERRED EMBODIMENTS

Figure 12:
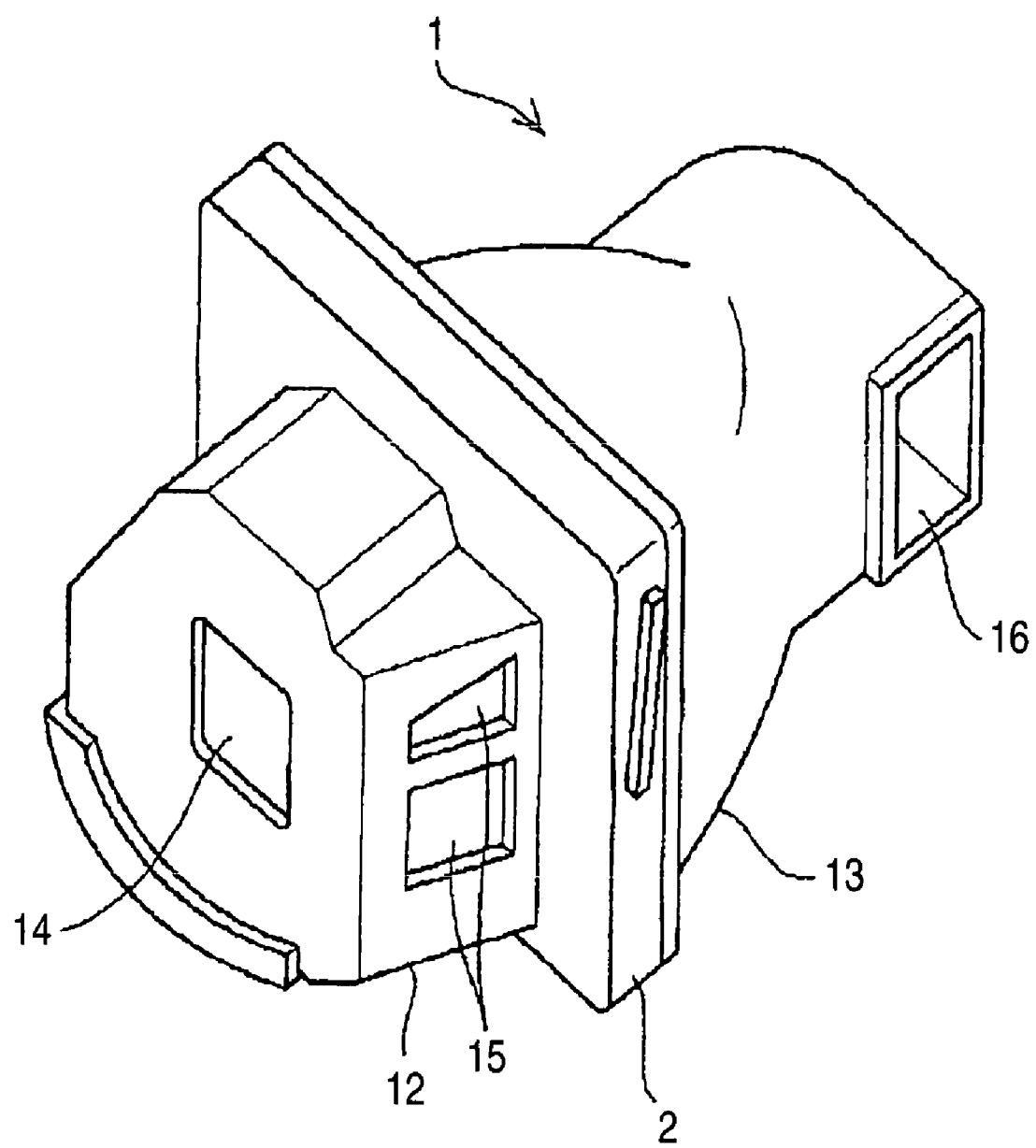
FIG. 12 is a schematic perspective view of a lamp unit employed for a projector that is one example of an optical apparatus.

In the lamp unit as shown in FIG. 12, a case 1 for accommodating a light source unit (not shown in the figure) includes a front cover 12 and a rear cover 13. And a light having directivity emitted from the light source unit accommodated within the case 1 is emergent through a light emission opening 14 of the front cover 12 and processed by an optical system of the projector. Also, the front cover 12 or the rear cover 13 is provided with a passage 15 or 16 for cooling wind, whereby the cooling wind circulating through this passage 15 or 16 suppresses a rise in temperature of the light source unit. Further, the front cover 12 has a lamp holder 2 almost square in front view. This front cover 12 is connected via this lamp holder 2 to the rear cover 13.

Figure 8:
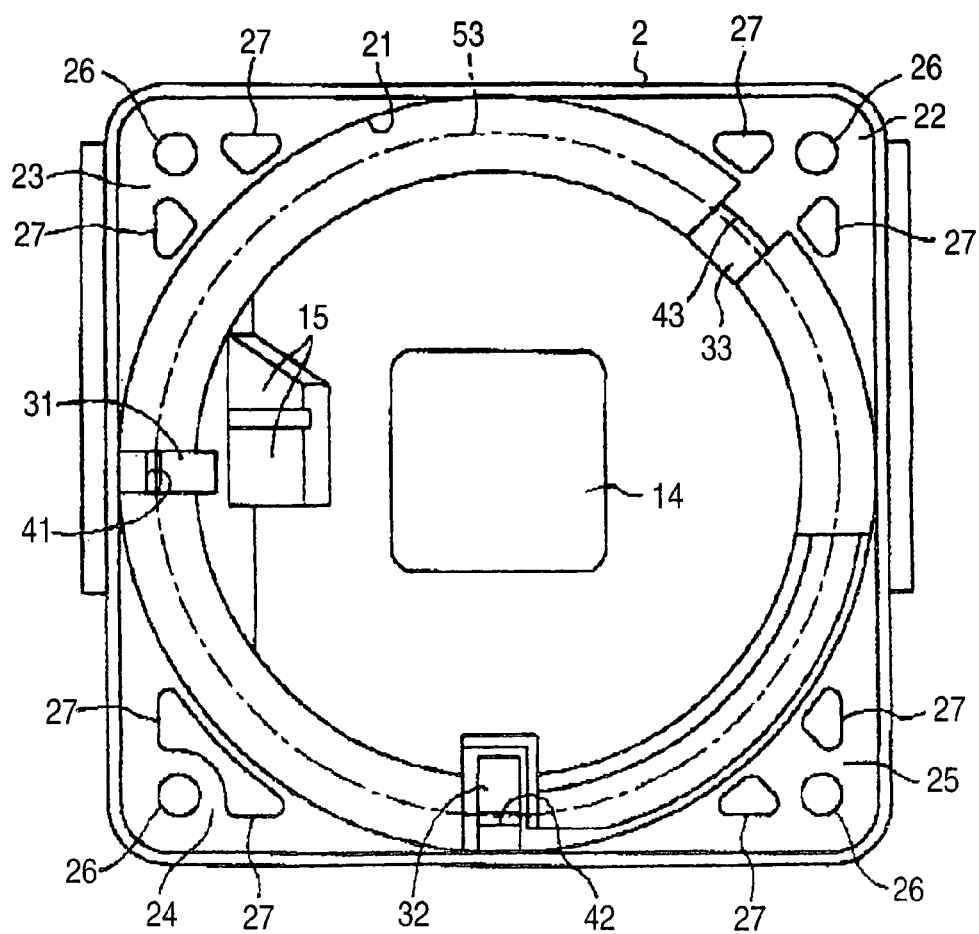
FIG. 8 is a front view of a lamp holder.

As shown in FIG. 8, the lamp holder 2 has a circular concave portion 21 communicating to an internal space of the front cover 12, in which the bearing surfaces 31, 32 and 33 are formed at three locations on the marginal part of this circular concave portion 21, and the receiving faces 41, 42 and 43 with step are stood outside the bearing surfaces 31, 32 and 33. Two bearing surfaces 31 and 32 among the three bearing surfaces 31, 32 and 33 are positioned at right angle to each other, while the remaining one bearing surface 33 is positioned at an equal angle from the two bearing surfaces 31 and 32. And in this embodiment, the two bearing surfaces 31 and 32 positioned at right angle are disposed on two mutually adjacent side parts of the lamp holder 2 of almost square shape, and the remaining one bearing surface 33 is disposed at one corner part of the lamp holder 2. In the shown example, the bearing surfaces 31, 32 and 33 are partially formed at three locations on the marginal part of the circular concave portion 21, but one annular bearing surface may be formed instead. Also, instead of the bearing surfaces 41, 42 and 43 partially formed at three locations, the receiving face may be stood annularly around the periphery of one annular bearing surface.

The flat mounting faces 22, 23, 24 and 25 are provided at the four corner parts of the lamp holder 2 of almost square shape. Each of the mounting faces 22 to 25 is provided with a tapped hole 26 opened on each of the mounting faces 22 to 25, and two recess portions 27, 27 at symmetrical locations across the tapped hole 26.

Figure 4:
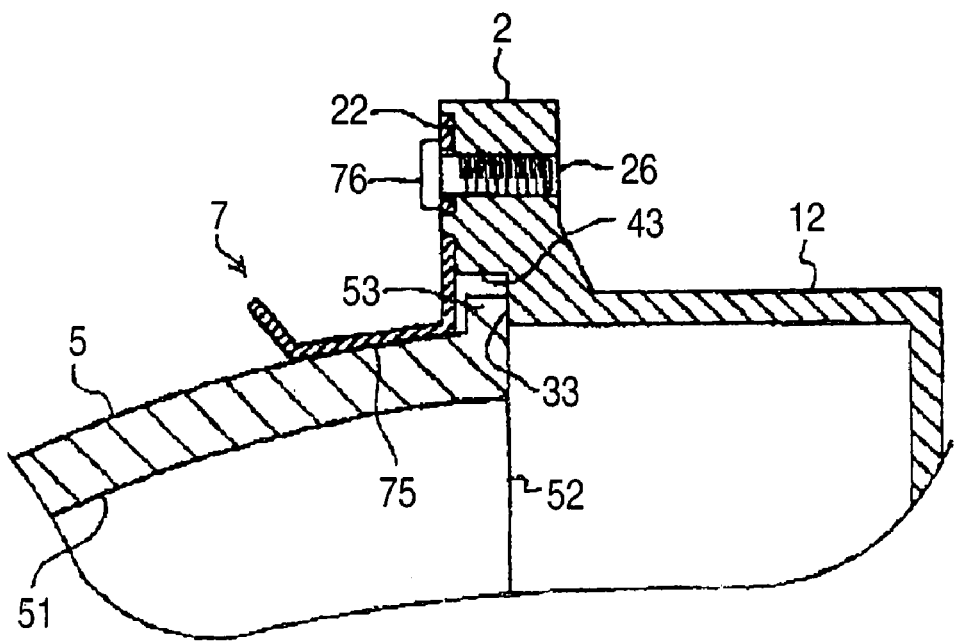
FIG. 4 is an enlarged cross-sectional view of a part along the line IV-IV of FIG. 1.
Figure 5:
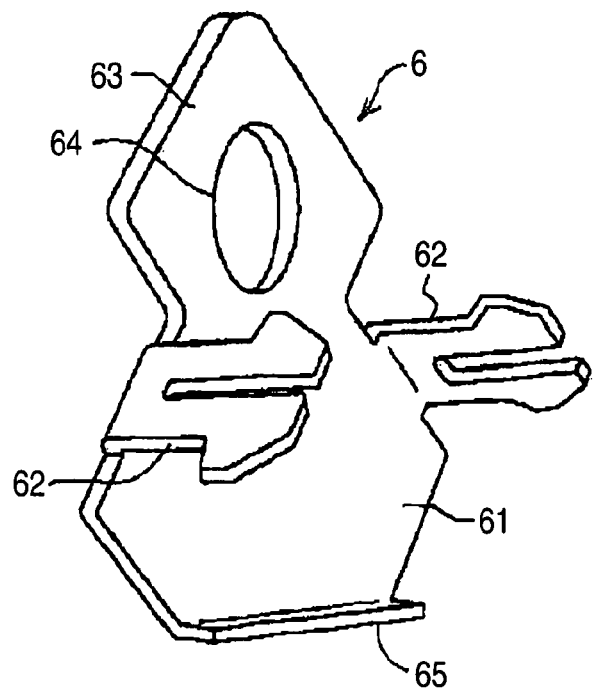
FIG. 5 is a perspective view of a presser.

The reflector 5 mounted on the lamp holder 2 has a reflecting surface 51 of paraboloid as its internal surface, directing the lights from a bulb (not shown) disposed in its center almost parallel to be led out through a circular light emission opening 52 at the top end, as shown in FIG. 4 or 5. Also, a flange portion 53 overhanging outside is provided around the light emission opening 52 of the reflector 5. As will be clear from FIG. 8, the bearing surfaces 31, 32 and 33 are disposed at the positions where the flange portion 53 can be laid as indicated by the imaginary line, and the receiving faces 41, 42 and 43 are disposed at the positions tangential to an imaginary circle having a slightly larger diameter than the outer diameter of the flange portion 53.

Figure 6:
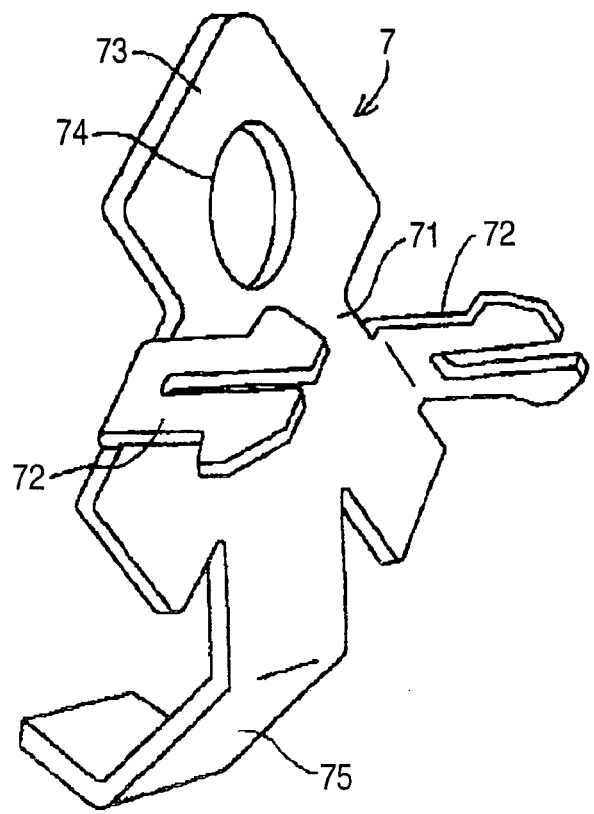
FIG. 6 is a perspective view of a lateral pressure applying member.

In the light source unit mounting structure of this invention, a presser 6 as shown in FIG. 5 and a lateral pressure applying member 7 as shown in FIG. 6 are employed as the fastener for mounting the reflector 5 on the lamp holder 2. The presser 6 of FIG. 5 includes a main piece part 61, two leg piece parts 62 bent on both sides of the main piece part 61, and a mount piece part 63 having a screw insertion hole 64, in which a pressure acting piece 65 like a low rib is bent at almost right angle to project in the same direction as the projecting direction of the leg piece parts 62 at the top end of the main piece part 61. On the contrary, the lateral pressure applying part 7 as shown in FIG. 6 includes a main piece part 71, two leg piece parts 72 bent on both sides of the main piece part 71, and a mount piece part 73 having a screw insertion hole 74, in which a pressure acting piece 75 is bent to project obliquely on the opposite side to the projecting direction of the leg piece parts 72 at the top end of the main piece part 71. And comparing the presser 6 of FIG. 5 and the lateral pressure applying part 7 of FIG. 6 geometrically, there is a different point that the lateral pressure applying member 7 has the pressure acting piece 75 projecting obliquely on the opposite side to the projecting direction of the leg piece parts 72, whereas the presser 6 has the pressure acting piece 65 like low rib bent almost at right angle to project in the same direction as the projecting direction of the leg piece parts 62. The other components including the main piece parts 61, 71, the leg piece parts 62, 72, and the mount piece parts 63, 73 are formed in the same or similar shape and size.

In a process of mounting the reflector 5 on the lamp holder 2, at the first step, the flange portion 53 of the reflector 5 is mounted on the three bearing surfaces 31, 32 and 33 of the lamp holder 2, and at the subsequent step, the presser 6 and the lateral pressure applying member 7 are fastened securely by screws to the lamp holder 2. This point will be further described below in detail.

Figure 1:
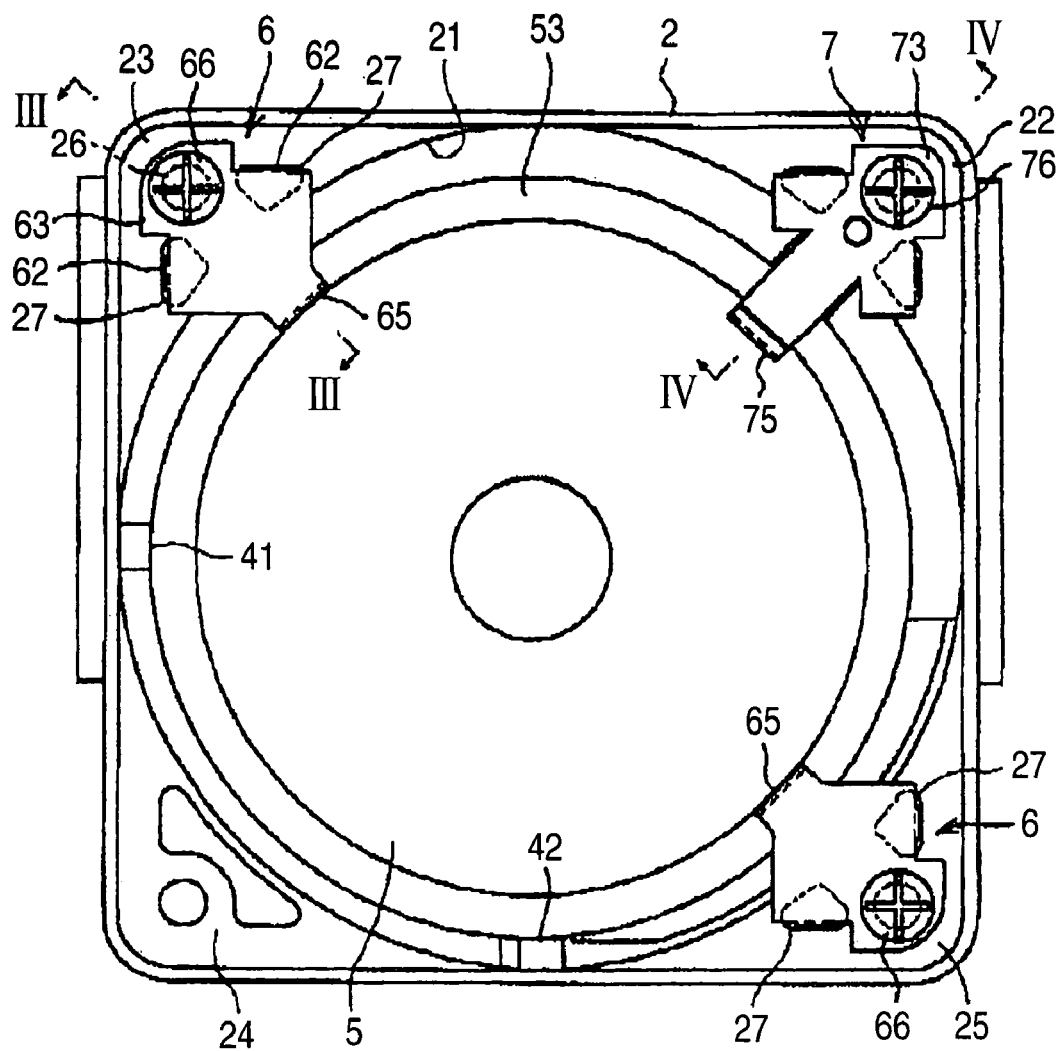
FIG. 1 is a front view of a light source unit mounting structure according to the present invention.
Figure 2:
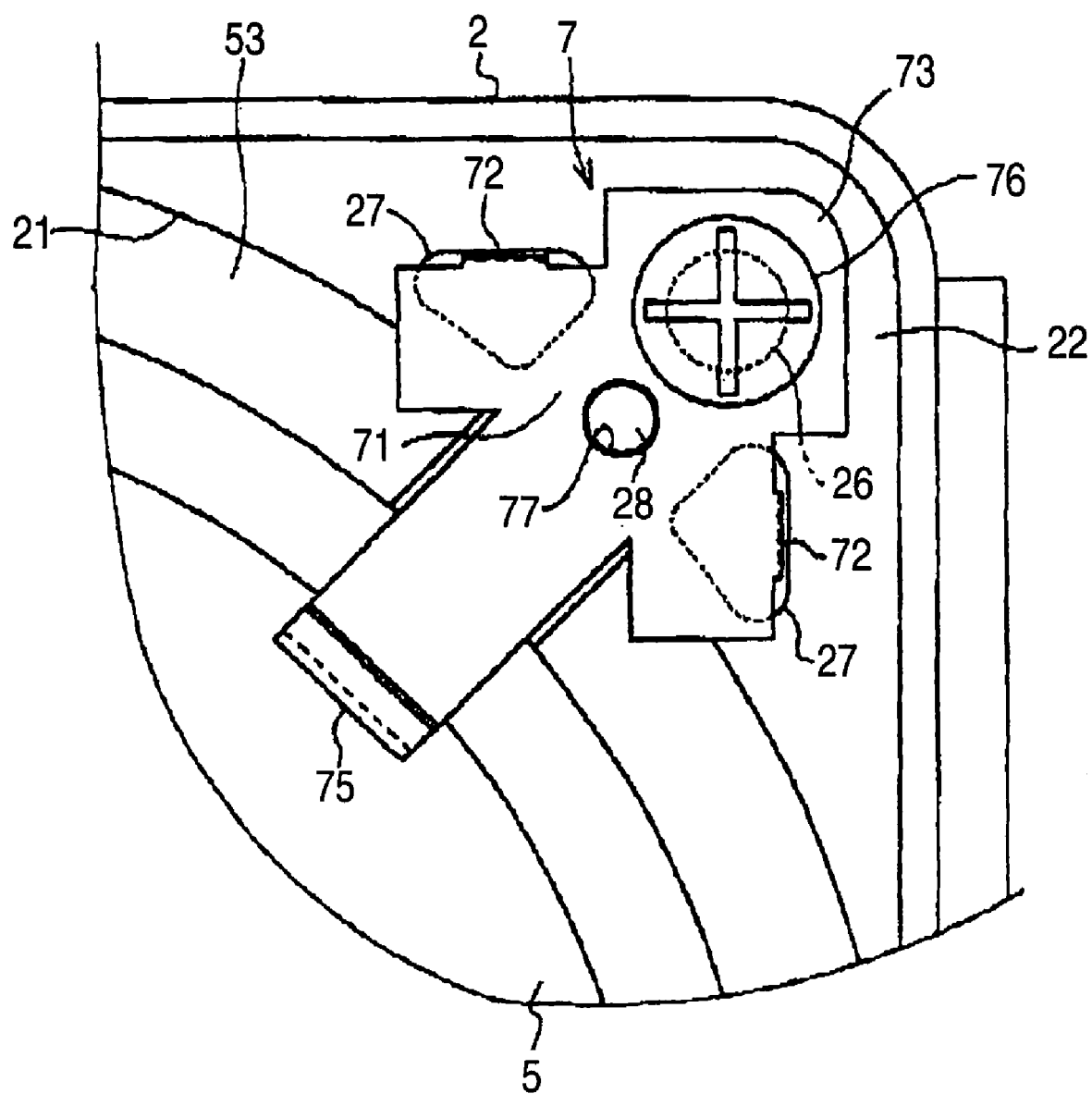
FIG. 2 is an enlarged view of FIG. 1.
Figure 3:
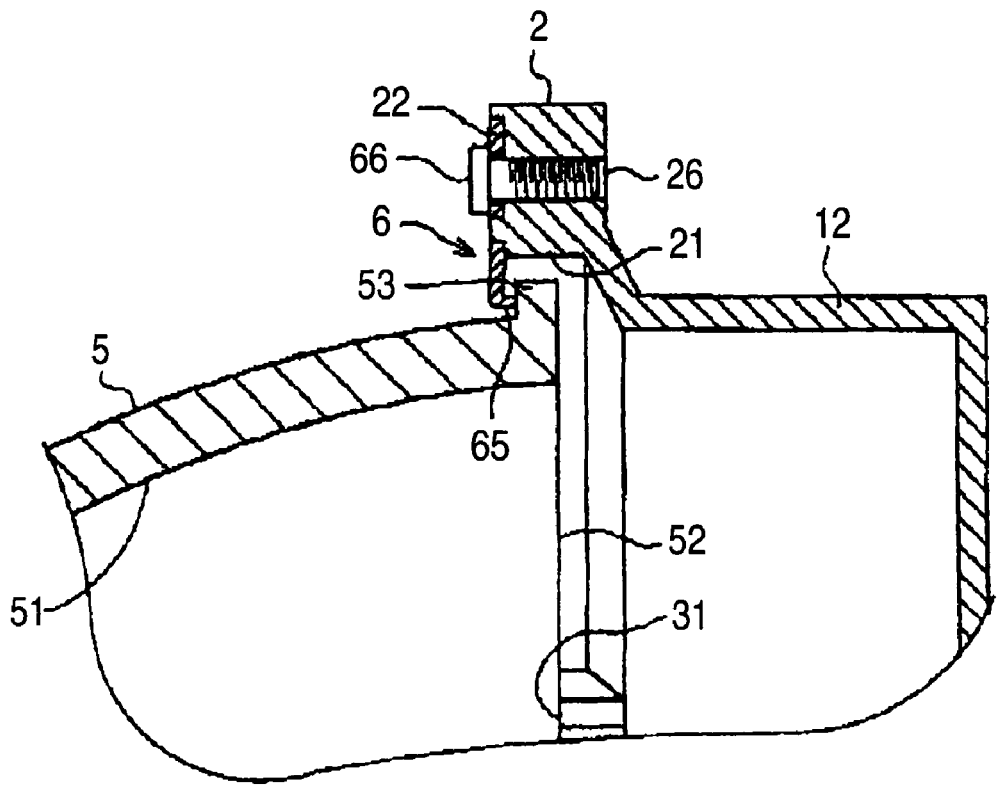
FIG. 3 is an enlarged cross-sectional view of apart along the line III-III of FIG. 1.

The main piece part 61 of the presser 6 is mounted on each of the two mounting faces 23 and 25 (see FIG. 8) positioned in the diagonal direction of the lamp holder 2 of almost square shape, and two leg piece parts 62 of the pressers 6 are inserted into two recess portions 27 on each mounting face 23 and 25, so that the screw insertion holes 64 of the mount piece parts 63 for the pressers 6 are aligned with the tapped holes 26 on the mounting faces 23 and 25. In this manner, the pressure acting pieces 65 of two pressers 6 are laid at two locations on the opposite sides across the center of the flange portion 53 of the reflector 5 mounted on the bearing surfaces 31, 32 and 33. For each presser 6, if the mounting screw 66 inserted through the screw insertion hole 64 of the mount piece part 63 is screwed into the tapped hole 26, and fastened to fix the mount piece part 63 to the mounting face 23, 25, the pressure acting piece 65 is elastically contacted with the flange portion 53 of the reflector 5, so that the flange portion 53 is elastically pressed and retained in the thickness direction between the presser 6 and the bearing surface 31, as shown in FIG. 1 or 3. Also, the main piece part 71 of the lateral pressure applying member 7 is mounted on the mounting face 22 (see FIG. 8) located at one corner part 90 degrees away from the two mounting faces 23, 25 of the lamp holder 2 of almost square shape, and the two leg piece parts 72 of the lateral pressure applying member 7 are inserted into two recess portions 27 on the mounting face 22, so that the screw insertion hole 74 of the mount piece part 73 for the lateral pressure applying member 7 is aligned with the tapped hole 26 on the mounting face 22. In this manner, the pressure acting piece 75 of the lateral pressure applying member 7 is laid on the outside surface near the light emission opening 52 of the reflector 5. Next, for the lateral pressure applying member 7, if the mounting screw 76 inserted through the screw insertion hole 74 of the mount piece part 73 is screwed into the tapped hole 26, and fastened to fix the mount piece part 73 to the mounting face 22, the pressure acting piece 75 is elastically pressed radially at one location on the outside surface near the flange portion 53 of the reflector 5 to press the outer circumferential end face of the flange portion 53 to the two receiving faces 41, 42, as shown in FIG. 1 or 2. Therefore, the opening edge part of the light emission opening 52 of the reflector 5 is elastically pressed and retained radially between the lateral pressure applying member 7 and the receiving faces 41, 42. The screwing of the presser 6 and the screwing of the lateral pressure applying member 7 as described above may be performed in any order.

In this embodiment, the flange portion 53 of the reflector 5 is elastically pressed and retained in the thickness direction by two pressers 6 and the bearing surfaces 31, 32 of the lamp holder 2, so that their elastically pressed and retained locations are defined at two locations on the opposite sides across the center of the flange portion 53, and the elastically pressed location of the lateral pressure applying member 7 on the reflector 5 is defined at the mutual center position between two elastically pressed and retained locations. And the elastically pressing direction of the lateral pressure applying member 7 on the reflector 5 is orthogonal to the opposite direction of the two elastically pressed locations by two pressers 6. Thereby, there is a less mounting error of the reflector 5 on the lamp holder 2, and because no unreasonable load is applied on the reflector 5, the mounting stability of the reflector 5 on the lamp holder 2 is improved.

Also, the presser 6 and the lateral pressure applying member 7 can be fastened securely by screws in a temporarily fixed state where the leg piece part 62, 72 are inserted into the recess portions 27 of the lamp holder 2 not to cause a large dislocation, whereby the screwing workability is improved. For the lateral pressure applying member 7 as shown in FIG. 2, when the mounting screw 76 is screwed in the screw fastening work by fitting a locating boss 28 projecting from the mounting face of the lamp holder 2 into a circular locating hole 77 opened in the main piece part 71, the lateral pressure applying member 7 is prevented from being rotated along with the mounting screw 76. In this manner, the pressure acting piece 75 of the lateral pressure applying member 7 makes the elastically pressing action radially on the reflector 5 accurately, whereby the mounting stability of the reflector 5 is further improved.

Figure 7:
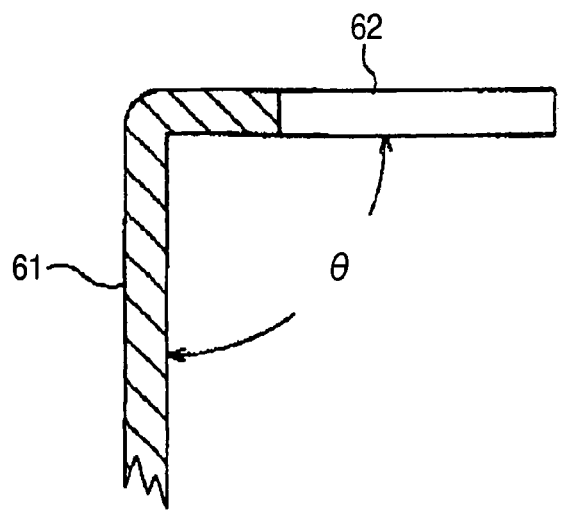
FIG. 7 is an explanatory view showing the opening angle between a main piece part and a leg piece part in the presser.
Figure 9:
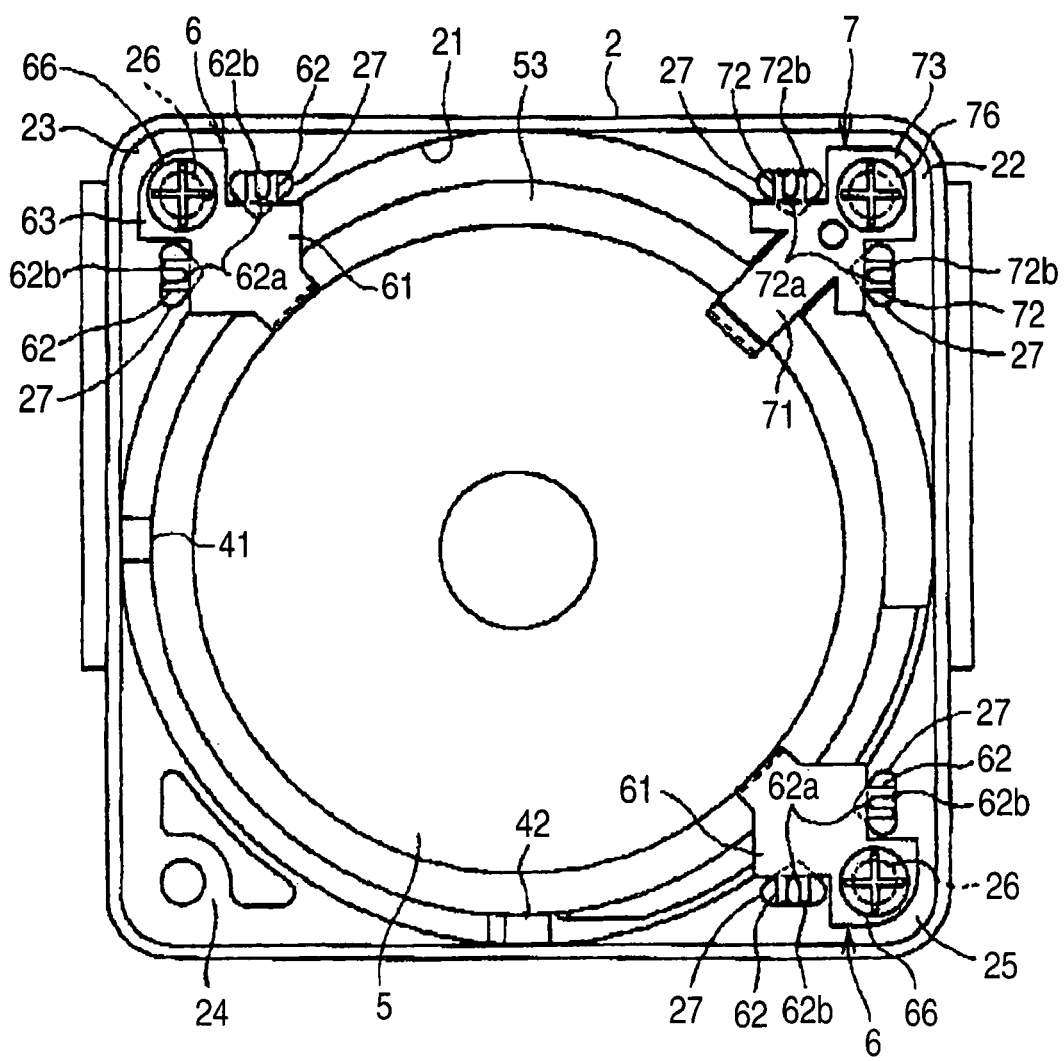
FIG. 9 is a front view of a light source unit mounting structure according to another embodiment.
Figure 10:
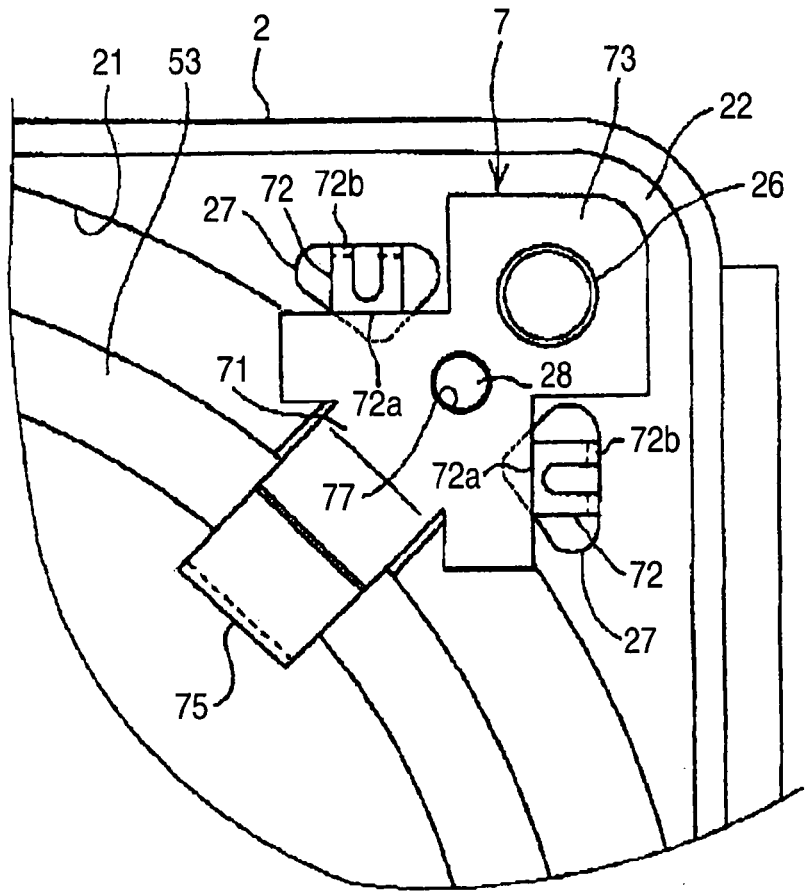
FIG. 10 is an enlarged view of FIG. 9.

In the above embodiment, the opening angle θ of the leg piece part 62 from the main piece part 61 in the presser 6 is defined at almost right angle, as shown in FIG. 7. Therefore, when the pressers 6 are disposed on the mounting faces 23 and 25 of the lamp holder 2, two leg piece parts 62 of each presser 6 are only inserted loosely into the recess portions 27 at two locations opened on the mounting face 23, and placed in a temporarily fixed state to suppress dislocation of the pressers 6 by the leg piece parts 62, but not to impede the pressers 6 from falling out of the lamp holder 2. Accordingly, when the presser 6 is fastened securely by screw, it is required that the lamp holder 2 is disposed with the mounting faces 23, 25 upward. The same thing can be said for the lateral pressure applying member 7. Thus, to improve this point, it is required to prevent the presser 6 and the lateral pressure applying member 7 from falling out of the lamp holder 2. Next, referring to FIGS. 9 to 11, another embodiment with such remedial measures will be described below.

Figure 11:
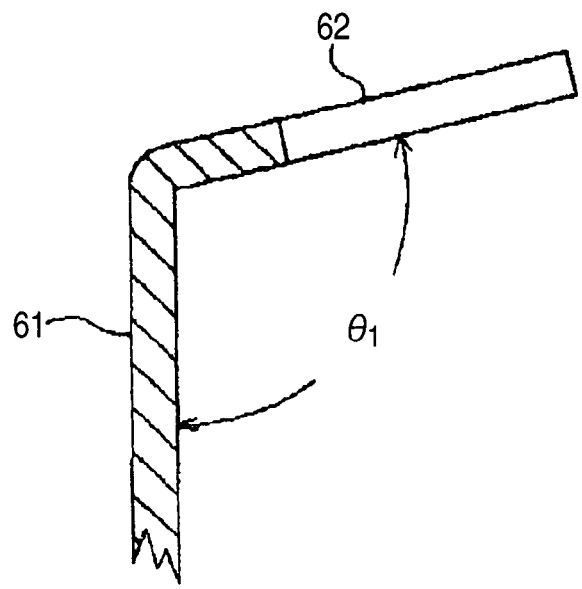
FIG. 11 is an explanatory view showing the opening angle between the main piece part and the leg piece part in the presser.

In this embodiment, the opening angle θ1 of each of the two leg piece parts 62 from the main piece part 61 in the presser 6 is defined at a larger angle than the right angle, as shown in FIG. 11. And within the recess portion 27 on the lamp holder 2 into which the leg piece part 62 is inserted, the root 62a and the top end 62b of the leg piece part 62 are elastically contacted with the inner wall face of the recess portion 27, as will be clear from FIG. 9. Similarly, for the lateral pressure applying member 7, the opening angle of each of the two leg piece parts 72 from the main piece part 71 is defined at a larger angle than the right angle, and within the recess portion 27 on the lamp holder 2 into which the leg piece part 72 is inserted, the root 72a and the top end 72b of the leg piece part 72 are elastically contacted with the inner wall face of the recess portion 27, as will be clear from FIGS. 9 and 10. The other constitution is the same as described with reference to FIGS. 1 to 6, wherein in FIGS. 9 to 11 the same or corresponding parts are designated by the same numerals as in FIGS. 1 to 6.

With this embodiment, when the pressers 6 are disposed on the mounting faces 23 and 25 of the lamp holder 2, the root 62a and the top end 62b of each of two leg piece parts 62 inserted into the recess portion 27 are elastically contacted with the inner wall face of the recess portion 27 and act to prevent them from falling out of the recess portion 27, resulting in a temporarily fixed state with an action of suppressing dislocation of the presser 6 with the leg piece part 62 and an action of preventing the presser 6 from falling out of the lamp holder 2. Accordingly, when the presser 6 is fastened securely by screw, it is not required that the lamp holder 2 is disposed with the mounting faces 23 and 25 upward. The same thing can be said for the lateral pressure applying member 7.

According to an aspect of the invention, the flange portion is elastically pressed and retained in the thickness direction between the presser fastened securely by screw to the lamp holder and the bearing surface of the lamp holder, so that the reflector is attached to the lamp holder. Also, the opening edge part of the light emission opening of the reflector is elastically pressed and retained radially between the lateral pressure applying member fastened securely by screw to the lamp holder and the receiving face with step outside the bearing surface, so that the reflector is positioned radially on the lamp holder. Accordingly, there is less mounting error of the reflector on the lamp holder, whereby the optical performance of an optical apparatus such as a projector is enhanced. Also, the presser and the lateral pressure applying member are fastened securely by screw to the lamp holder, whereby the mounting workability of the reflector on the lamp holder is more excellent.

According to an aspect of the invention, the mounting stability of the reflector on the lamp holder is improved without exerting unreasonable load on the reflector. Therefore, the reflector is unlikely to break due to high temperatures or vibrations.

According to an aspect of the invention, in fastening by screws the presser and the lateral pressure applying member to the lamp holder, each of the leg piece parts is inserted into the recess portion of the lamp holder to make a temporarily fixed state, and the presser and the lateral pressure applying member in the temporarily fixed state are fastened by screws to the lamp holder, whereby the mounting workability of fastening by screws the presser and the lateral pressure applying member to the lamp holder is improved.

According to an aspect of the invention, the presser and the lateral pressure applying member are placed in the temporarily fixed state where they are temporarily fixed immovably to the lamp holder by the leg piece parts elastically contacting the inner wall face of the recess portion in the lamp holder, whereby the mounting workability of fastening by screws the presser and the lateral pressure applying member to the lamp holder is further improved.

According to an aspect of the invention, the positional accuracy of the reflector mounted on the lamp holder is enhanced, whereby the optical performance of an optical apparatus such as a projector employing this mounting structure is more stable. Therefore, there is an effect that the quality of image reflected over the screen in the projector is improved, whereby the user can enjoy the image with better quality. Moreover, there is another effect that the mounting workability of the reflector on the lamp holder is improved without exerting unreasonable load on the reflector, and the reflector is unlikely to break.

What is claimed is:

1. A light source unit mounting structure comprising:
a light source unit, including a reflector for reflecting light of a light source on a concave reflecting surface to give a directivity; and
a lamp holder, on which the light source unit is mounted by securing an opening edge part of a light emission opening of the reflector to the lamp holder, wherein
an annular flange portion around the light emission opening of the reflector mounted on a bearing surface provided at the lamp holder is elastically pressed by two pressers fastened by screws to the lamp holder, so that the flange portion is elastically pressed and retained in a thickness direction between the pressers and the bearing surface, and an outer circumferential end face of the flange portion is pressed against a receiving face having a step shape provided outside of the bearing surface of the lamp holder with an outside surface of the reflector elastically pressed radially by a lateral pressure applying member fastened by a screw to the lamp holder, so that the opening edge part of the light emission opening of the reflector is elastically pressed and retained radially between the lateral pressure applying member and the receiving face,
the flange portion is elastically pressed at two locations on opposite sides across a center of the flange portion by the two pressers, one elastically pressed location of the reflector by the lateral pressure applying member is defined at a mutually central position between two elastically pressed locations of the flange portion by the pressers, and an elastically pressing direction of the lateral pressure applying member on the outside surface of the reflector is orthogonal to an opposite direction of the two elastically pressed locations of the flange portion by the pressers;
the presser includes a first main piece part overlaid on a first mounting surface of the lamp holder, a first leg piece part bent from the first main piece part and inserted into a first recess portion opened on the first mounting surface of the lamp holder, a first mounting piece part fixed to the lamp holder by a first mounting screw screwed into a first tapped hole opened on the first mounting surface of the lamp holder, and a first pressure acting piece projecting on an opposite side of the first mounting piece part across the first leg piece part and pressing the flange portion against the bearing surface by elastically contacting with the flange portion;
the lateral pressure applying member includes a second main piece part overlaid on a second mounting surface of the lamp holder, a second leg piece part bent from the second main piece part and inserted into a second recess portion opened on the second mounting surface of the lamp holder, a second mounting piece part fixed to the lamp holder by a second mounting screw screwed into a second tapped hole opened on the second mounting surface of the lamp holder, and a second pressure acting piece projecting on an opposite side of the second mounting piece part across the second leg piece part and pressing the reflector radially by elastically contacting with the outside surface of the reflector; and
an opening angle of the first leg piece part from the first main piece part is larger than the right angle, so that a root and a top end of the first leg piece part within the first recess portion on a side of the lamp holder into which the first leg piece part is inserted are elastically contacted with an inner wall face of the first recess portion, and an opening angle of the second leg piece part from the second main piece part is larger than the right angle, so that a root and a top end of the second leg piece part within the second recess portion on a side of the lamp holder into which the second leg piece part is inserted are elastically contacted with an inner wall face of the second recess portion.

2. A light source unit mounting structure comprising:

a reflector, adapted to reflect light of a light source to give a directivity and provided with a flange portion including a first surface and a second surface;

a lamp holder, including a third surface facing the first surface, a fourth surface facing the second surface, a fifth surface, and a sixth surface;

a first mounting structure, including a first pressing member fixed on the fifth surface and pressing the flange portion to the lamp holder in a first direction so that the first surface of the flange portion is held in contact with the third surface of the lamp holder; and a second mounting structure, including a second pressing member fixed on the sixth surface and pressing an outer surface of the reflector in a second direction perpendicular to the first direction so that the second surface of the flange portion is held in contact with the fourth surface of the lamp holder.

3. The light source unit mounting structure according to claim 2, further comprising:

a third mounting structure, having a similar structure to the first mounting structure, wherein the first and third mounting structures are arranged at opposite sides of a center of the flange portion, and the second mounting structure is arranged between the first and third mounting structures.

4. The light source unit mounting structure according to claim 3, wherein the second direction is orthogonal to an opposite direction of the first and third mounting structures.

5. The light source unit mounting structure according to claim 2, wherein the first pressing member includes a main piece mounted on the fifth surface of the lamp holder, a leg piece bent from the main piece and inserted into a recess portion formed on the fifth surface of the lamp holder, a mounting piece fixed to the lamp holder by a screw screwed into a tapped hole formed on the fifth surface of the lamp holder, and a pressure piece pressing the flange portion against the third surface of the lamp holder and projecting on an opposite side of the mounting piece across the leg piece.

6. The light source unit mounting structure according to claim 5, wherein an angle of the leg piece from the main piece is larger than the right angle, so that a root and a top end of the leg piece within the recess portion are contacted with an inner wall face of the recess portion.

7. The light source unit mounting structure according to claim 2, wherein the second pressing member includes a main piece mounted on the sixth surface of the lamp holder, a leg piece bent from the main piece and inserted into a recess portion formed on the sixth surface of the lamp holder, a mounting piece fixed to the lamp holder by a screw screwed into a tapped hole formed on the sixth surface of the lamp holder, and a pressure piece pressing the outer surface of the reflector in the second direction and projecting on an opposite side of the mounting piece across the leg piece.

8. The light source unit mounting structure according to claim 7, wherein an angle of the leg piece from the main piece is larger than the right angle, so that a root and a top end of the leg piece within the recess portion are contacted with an inner wall face of the recess portion.

* * * * *